June 5, 1962 R. L. LANDIS 3,037,251
SEALING GASKETS
Filed April 8, 1959 2 Sheets-Sheet 1
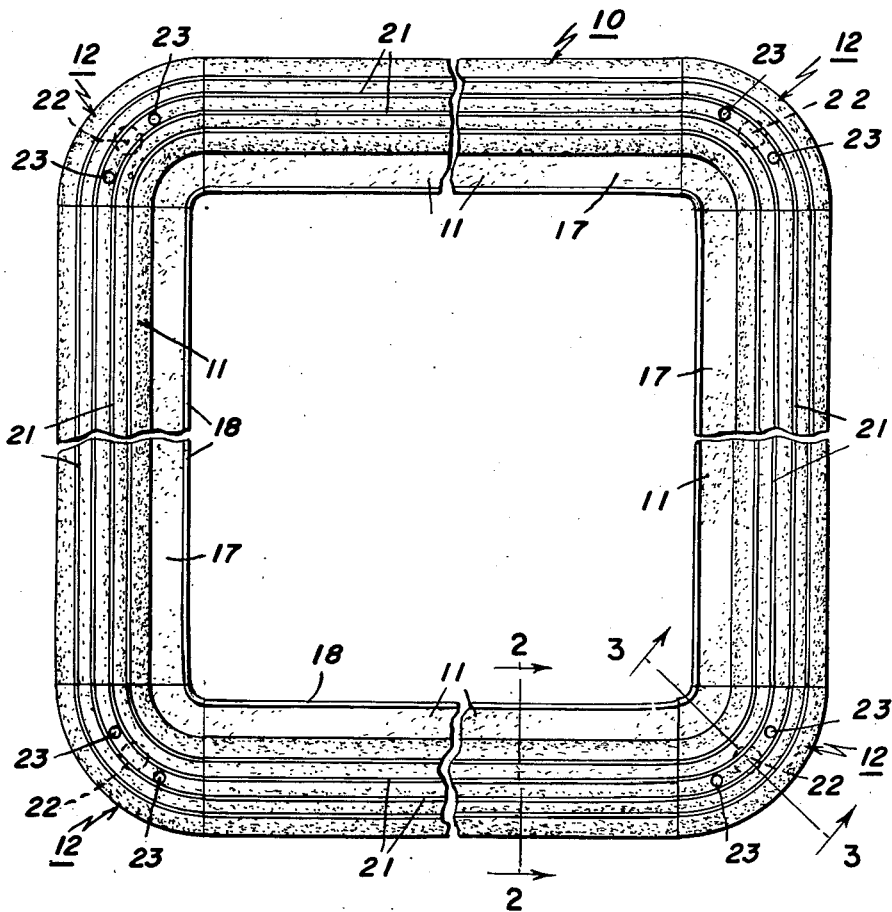
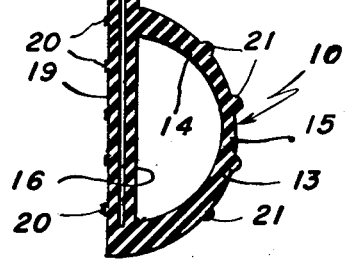
INVENTOR
ROBERT L. LANDIS
BY
E. F. Salter
ATTORNEY June 5, 1962   R. L. LANDIS   3,037,251
SEALING GASKETS Filed April 8, 1959   2 Sheets-Sheet 2

INVENTOR
ROBERT L. LANDIS

BY
ATTORNEY

United States Patent Office 3,037,251
Patented June 5, 1962

3,037,251
SEALING GASKETS
Robert L. Landis, 2774 Kring Drive, San Jose 25, Calif.
Filed Apr. 8, 1959, Ser. No. 805,056
3 Claims. (Cl. 20—69)

This invention relates to a sealing gasket and more particularly to a heavy duty sealing gasket especially adapted for use in sealing the covers of ice hatches or doors of a refrigerator car or the like.

A primary object of the invention is the provision of a hollow compressible sealing gasket which will retain its shape and resiliency under continuous usage involving repeated opening and closing of the hatch cover or the like with which it is associated under a wide variety of weather and temperature conditions.

A further object of the invention is the provision of such a sealing gasket which may be prefabricated in a selected variety of standard sizes and shapes for expeditious installation on all standard shape and size hatch covers or refrigerator car doors.

A still further object of the invention is the provision of such a sealing gasket which is provided, preferably at its corners, with integral resilient bumpers or buffers for the purpose of cushioning the fall of a hatch cover for example and to maintain the gasket in its normally expanded condition even though carrying the weight of the hatch cover.

A still further object of the invention is the provision of such a hatch cover gasket with a substantially flat base portion and a rounded outer portion, the rounded portion normally comprising the under side of the gasket and being provided at suitable intervals with drainage openings to prevent the accumulation of moisture or water which might subsequently freeze and impair the effectiveness of the gasket as a compressible seal.

Still another object of the invention is the provision of such a gasket provided with an integral extended securing strip of double thickness which may be nailed or screwed to the member to which the gasket is to be attached.

To the end of a clearer understanding of the instant invention, it is pointed out that in the manufacture of the gasket the straight side and end portions thereof are preferably formed by an extrusion process, following which adjacent side or end portions are positioned at right angles to each other in a corner mold containing a suitable shaping mandrel or core for the formation of the corner portions including the bumpers and drainage openings by injection molding.

Heretofore with a gasket constructed according to the above described process, it would have been necessary to slit the corners of the gasket in order to remove the mandrel after the molding operation, which slit would leave a discontinuous or interrupted under surface, presenting difficulties in nailing or otherwise securing the gasket to its carrying member. By virtue of the continuous under flap, above mentioned however, such slitting may be avoided through the effective under surface of the gasket, and the mandrel removed through an interior slit, which may be closed by the securement of the under flap to provide a constant or uninterrupted surface under the corners which provides an effective and positive seal.

Applicant is aware that various types of heavy duty gaskets have hitherto been employed as seals under similar conditions. Customarily, these gaskets have been formed of a solid strip of sponge rubber or the like surrounded by a canvas covering. Gaskets of this type have been found to be unsuitable under conditions of active use for the reason that sponge rubber does not have sufficient strength to withstand the continuous pressure and ultimately flattens out, reducing its effectiveness. Additionally, the canvas covering, even though initially waterproof, tends in time to lose its waterproof characteristics, and the canvas material then tends to freeze or adhere to the car under low temperature conditions, rendering it extremely difficult to open the hatch cover in cold weather, or alternatively subjecting the gasket to such stress as to result in tearing of the same.

A further very important object of the invention is the provision of an improved gasket which will obviate the above mentioned difficulties.

Still other objects of the invention reside in the combinations of elements, arrangements of parts, and features of construction, all as will be more fully pointed out hereinafter and disclosed in the accompanying drawings wherein there is shown a preferred embodiment of the instant inventive concept.

In the drawing:

FIGURE 1 is a bottom plan view of the improved sealing gasket, partially broken away.

FIGURE 2 is an enlarged detail sectional view taken substantially along the line 2—2 of FIG. 1 as viewed in the direction indicated by the arrows.

Figure 3:
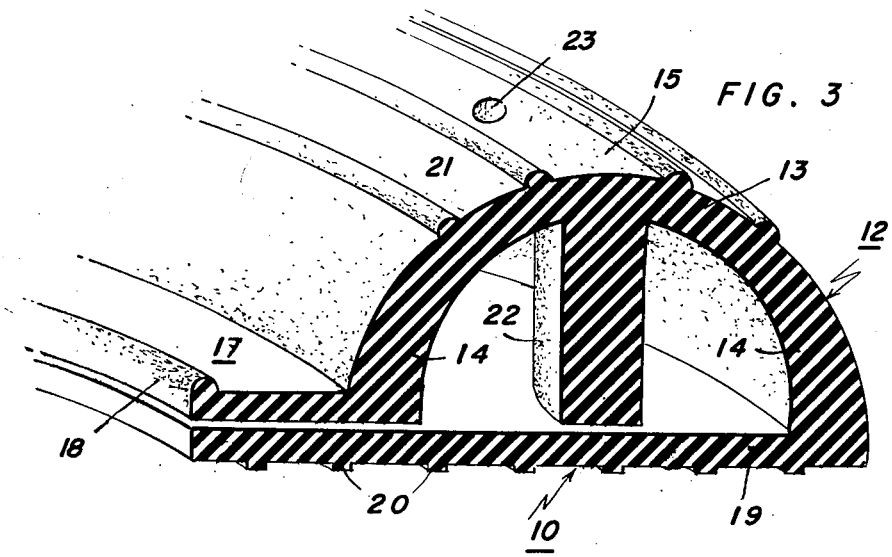
FIGURE 3 is an enlarged sectional view taken substantially along the line 3—3 of FIG. 1 as viewed in the direction indicated by the arrows.

With continued reference to the drawing, wherein similar reference characters refer to similar parts throughout the several views, there is generally indicated at 10 a hollow resilient compressible gasket constructed in accordance with the instant invention. The gasket is preformed in any desired size closely to engage the perimetric margin of the structure, such as an ice hatch cover, with which it is associated. The gasket is preferably formed of side and end strips 11 which may be extruded in continuous lengths, and which are subsequently connected by corner pieces or portions 12 molded about a suitable mandrel which is subsequently removed from the interior of the gasket. In the illustrative embodiment of the invention shown, these corner moldings are shown as of arcuate configuration.

As best shown in FIGS. 2 and 3, the gasket in cross-section comprises an arcuate outer portion 13 of which the side walls 14 are relatively thicker than and tapered toward the outer or crown portion 15, and a flat base 16 which includes a laterally extending securing strip 17. This strip 17 preferably extends interiorly of the formed rectangular gasket and is provided along its inner edge with a bead 18. Integrally secured to the outer marginal edge of the base 16 is an under flap 19 which extends transversely or laterally the full width of the base 16 and its associated securing strip 17 and which is provided with longitudinally extending slip resistant ribs or beads 20. The outer surface of the arcuate portion 13 of the gasket is also provided with similar ribs or beads 21.

Each corner portion 12 of the gasket is molded and in its formation is provided with a vertically or outwardly extending integral bumper or buffer 22 which extends substantially the full height or thickness of the interior of the gasket. The bumper 22 may be of any desired shape. In the illustrated embodiment, it is shown as of circular cross-section for simplicity in molding, and of sufficient strength and thickness to resist compression when the weight of a hatch cover, which may be in excess of one hundred pounds, is placed or slammed thereon.

Figure 4:
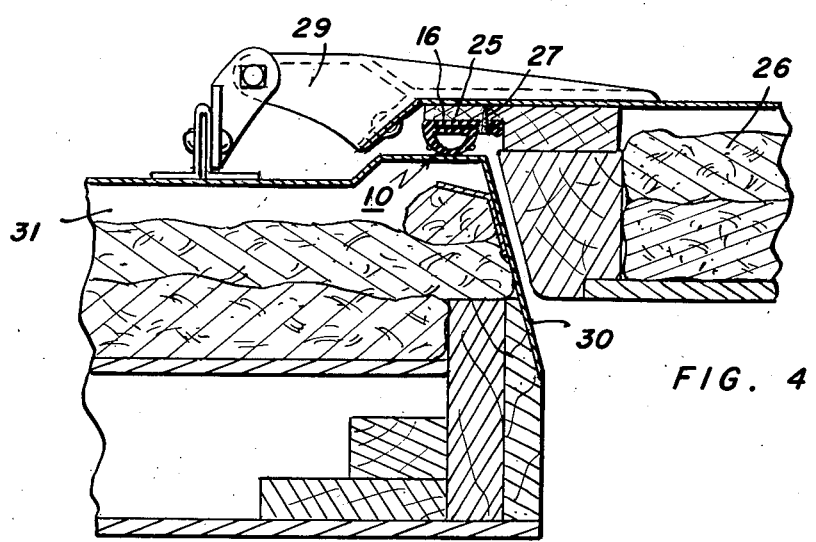
FIGURE 4 is a reduced sectional view through a hatch cover for a refrigerator car showing the relative positioning of the gasket when in use.

The outer surface of the gasket normally constitutes the under or contacting surface thereof, as best shown in FIG. 4, and in operative position, and in order to prevent collection of water or moisture interiorly of the gasket, which may freeze and damage the gasket or interfere with its proper functioning, suitable drainage openings 23 are provided on opposite sides of the bumpers 22.

In the assembly of the device, the gasket is positioned horizontally entirely about the rim 25 of a refrigerator car hatch cover 26, and is secured in position by means of suitable nails 27 driven through the securing strip 17 and the under flap 19 in the case of a wooden hatch cover, or, alternatively, screws in the case of a metal hatch cover.

FIG. 4 illustrates the relative position of the ice hatch cover 26 which is mounted as by means of conventional hinges 29 in an ice hatch 30 positioned in the top of a conventional insulated refrigerator car 31.

In the illustrative embodiment the gasket is shown as mounted in substantially horizontal position, although obviously it may be mounted in vertical position or in any desired angular relation in conformity to the structure with which it is adapted to be used.

The material of which the gasket is made is preferably a relatively hard compressible resilient natural or synthetic rubber, although certain types of plastic materials having similar characteristics may be found suitable.

What is claimed is:

1. A heavy duty sealing gasket comprising a substantially rectangular hollow continuous body formed of resilient compressible material, said body having a flat inner base portion and an arcuate outer portion, and a plurality of spaced, interiorly positioned solid cushioning bumpers formed integrally with one of said body portions and substantially bridging the space between the crown of the arcuate portion of the gasket and the flat base thereof in the expanded condition of the gasket.

2. A heavy duty sealing gasket comprising a substantially rectangular hollow continuous body formed of resilient compressible material and having straight side and cover portions, said body having a flat inner base portion and an arcuate outer portion, and an interiorly positioned integral solid cushioning bumper located at each corner portion of the gasket and substantially bridging the space between the crown of the arcuate portion of the gasket and the flat base thereof.

3. A heavy duty sealing gasket comprising a substantially rectangular hollow continuous body formed of resilient compressible material and having straight side and corner portions, said body having a flat inner base portion and an arcuate outer portion, and an interiorly positioned integral solid cushioning bumper located at each corner portion of the gasket and substantially bridging the space between the crown of the arcuate portion of the gasket and the flat base thereof, said arcuate portion being provided with drainage openings adjacent said cushioning bumpers.

References Cited in the file of this patent

UNITED STATES PATENTS

| | | |
|---|---|---|
| 1,500,200 | Overstreet | July 8, 1924 |
| 2,070,725 | Gail | Feb. 16, 1937 |
| 2,141,481 | Mattingly | Dec. 27, 1938 |
| 2,263,831 | Welch | Nov. 25, 1941 |
| 2,657,438 | Spraragen | Nov. 3, 1953 |
| 2,705,655 | Brown et al. | Apr. 5, 1955 |
| 2,760,243 | Korb | Aug. 28, 1956 |